United States Patent [19]

Sopko

[11] 4,022,601
[45] May 10, 1977

[54] METHOD AND APPARATUS FOR COATING A GLASS SUBSTRATE

[75] Inventor: John F. Sopko, Levelgreen, Pa.

[73] Assignee: PPG Industries, Inc., Pittsburgh, Pa.

[22] Filed: June 2, 1975

[21] Appl. No.: 583,333

[52] U.S. Cl. .............................. 65/60 D; 65/99 A; 118/47; 118/49.1; 118/65; 427/109; 427/255

[51] Int. Cl.² ........................................ C03C 17/22

[58] Field of Search .............. 65/60 R, 60 A, 60 B, 65/99 A, 60 D; 427/248, 255, 109; 118/49.1, 49.5, 47, 65, 48

[56] References Cited

UNITED STATES PATENTS

| | | | |
|---|---|---|---|
| 2,215,996 | 9/1940 | Benton | 118/47 X |
| 3,161,537 | 12/1964 | Dettre et al. | 427/255 |
| 3,660,061 | 5/1972 | Donley et al. | 65/60 B X |
| 3,689,304 | 9/1972 | Bamford | 65/60 B X |
| 3,778,243 | 12/1973 | Johnston | 65/60 B X |
| 3,850,679 | 11/1974 | Sopko et al. | 65/60 B X |
| 3,880,112 | 4/1975 | Spitz et al. | 118/48 X |
| 3,888,649 | 6/1975 | Simhan | 65/60 B |

*Primary Examiner*—Robert L. Lindsay, Jr.
*Attorney, Agent, or Firm*—Donald Carl Lepiane; E. Kears Pollock

[57] ABSTRACT

A continuous glass ribbon advances from a float forming chamber past a first heat source and into a coating chamber where a surface of the glass ribbon is provided with a pyrolytic oxide coating as a second heat source heats the opposed surface of the glass ribbon. Thereafter the glass ribbon is advanced into an annealing lehr to relieve residual stress in the glass ribbon. The first heat source reduces the heat loss of the ribbon as it advances into the coating chamber to provide a durable pyrolytic oxide coating on the glass ribbon. The second heat source heats the ribbon to minimize or eliminate glass ribbon warpage.

11 Claims, 4 Drawing Figures

METHOD AND APPARATUS FOR COATING A GLASS SUBSTRATE

RELATED U.S. PATENT APPLICATIONS AND U.S. PATENTS

This invention may be practiced using the method of and apparatus for coating a heated glass sheet taught in U.S. Pat. Nos. 3,660,061 and 3,850,679; in U.S. application Ser. No. 315,394 filed on Dec. 15, 1972, in the name of Krishna Simhan and entitled "Nozzle for Chemical Vapor Deposition" now U.S. Pat. No. 3,888,649; and in U.S. patent application Ser. Nos. 533,609 and 533,610 filed Dec. 17, 1974, in the name of John F. Sopko and entitled "Coating Composition Vaporizer". The teachings of the above-identified U.S. patents and patent applications are hereby incorporated by reference.

BACKGROUND OF THE INVENTION

1. Field of the Invention

This invention relates to a method of and apparatus for coating a continuous heated substrate, e.g., a glass ribbon.

2. Discussion of the Technical Problems

Pyrolytic oxide coating of a continuous glass ribbon has been recognized in the prior art. For example, in U.S. Pat. Nos. 3,660,061 and 3,850,679; in U.S. patent application Ser. No. 315,394 filed on Dec. 15, 1972, in the name of Krishna Simhan and entitled "Nozzle for Chemical Vapor Deposition", now U.S. Pat. No. 3,888,649, and in U.S. Pat. application Ser. No. 533,609 and 533,610 filed Dec. 17, 1974, in the name of John F. Sopko and entitled "Coating Composition Vaporizer" there is taught a method of and apparatus for coating a continuous glass ribbon as it advances from the exit end of a forming chamber into an annealing lehr.

In general, a coating apparatus is provided in a coating chamber located downstream of the exit end of the forming chamber and upstream of the entrance end of the annealing lehr. The coating apparatus directs a coating fluid, e.g., a heated coating vapor or a coating spray of an organo metallic composition toward the heated glass ribbon and the heat of the glass ribbon pyrolyzes the coating to form a metal oxide coating thereon. Exhaust hoods are provided about the coating apparatus to prevent coating vapors from moving into the annealing lehr and forming chamber.

Although the coating apparatus taught in the above-mentioned U.S. patents and U.S. patent applications are ideally suitable for applying a pyrolytic oxide coating to the glass ribbon surface, there are other associated problems.

The glass ribbon as it advances from the forming chamber through the coating chamber loses heat by radiation, conduction and/or convection. It has been determined that temperature drops between the exit end of the forming chamber and the entrance end of the annealing lehr can vary between about 100°–200° F. (55°–111° C.) depending on the type of coating apparatus used, speed of the ribbon and ribbon thickness.

As can be appreciated by those skilled in the art of pyrolytic oxide coating, a glass ribbon temperature variation range of 100°–200° F. (55°–111° C.) is not acceptable for a uniform and/or durable coating.

Another limitation in the prior art technique of pyrolytic oxide coating is ribbon warpage. Glass ribbons, particularly glass ribbons having a thickness of ¼ inch (0.64 centimeter) or less, have been found to warp immediately downstream of the coating apparatus. The warpage has a sinuous shape about an axis transverse to the glass ribbon path and amplitudes of up to 3 inches (7.62 centimeters) for glass thickness of about ⅛ inch (0.32 centimeter). With accentuated warpage the downstream exhaust hood and in certain instances the coating apparatus has to be raised to prevent contact with glass ribbon that could mar or fracture the glass ribbon.

An undesirable condition exists when the exhaust hoods are raised greater than about 3 inches (8 centimeters) above the glass ribbon path. For example, the coating vapors are not exhausted and pass into the environment, annealing lehr and float forming chamber. Further, in most instances, a coating inspection device is mounted immediately upstream of the annealing lehr. The coating vapors that are not exhausted deposit on the inspection device rendering it unable to immediately determine the quality of the coating on the glass ribbon.

It would be advantageous, therefore, if the limitations of the prior art pyrolytic oxide coating process were eliminated.

SUMMARY OF THE INVENTION

This invention relates to an improvement over the method of coating a heated sheet, e.g., a glass ribbon advancing along a ribbon movement path from exit end of a heat forming means, e.g., a float forming chamber toward a coating means mounted in a coating chamber. The coating means directs a fluid coating reactant toward the sheet to coat same. The glass ribbon as it advances from the float chamber to the annealing lehr decreases in temperature as a result of radiation, conduction and/or convection heat losses. The improvement includes the step of reducing heat loss of the glass ribbon as it advances from the forming chamber to the coating means.

The invention further includes the step of heating the underside of the glass ribbon as it moves past the coating means to prevent glass ribbon warpage. The improved steps of reducing heat loss and heating the glass ribbon may be practiced separately or together.

Still further this invention relates to an apparatus for carrying out the methods of the invention.

DESCRIPTION OF THE INVENTION

This invention relates to coating a heated substrate, e.g., a continuous ribbon of glass, with a metal oxide film formed by pyrolyzing a film forming composition directly onto a surface of the heated substrate. In general, the glass ribbon moves in a downstream direction along a substrate movement path from a heated environment, e.g., a float forming chamber past a coating apparatus and into an annealing lehr where residual stress in the glass ribbon are relieved.

A first heat source is positioned adjacent the glass ribbon surface to be coated, i.e., the upper surface of the glass ribbon, and upstream of the coating apparatus and a second heat source is positioned adjacent the bottom surface of the glass ribbon adjacent the coating apparatus. The first heat source reduces and/or eliminates radiation, convection and/or conduction heat losses of the glass ribbon as it moves from the forming chamber past the coating apparatus to maintain the glass surface temperature within a predetermined temperature range to enhance the durability of the coating. The second heat source reduces glass ribbon warpage. The warpage has a sinuous shape about an axis that is generally transverse to the substrate movement path and is normally seen immediately downstream of the coating apparatus.

Figure 1:
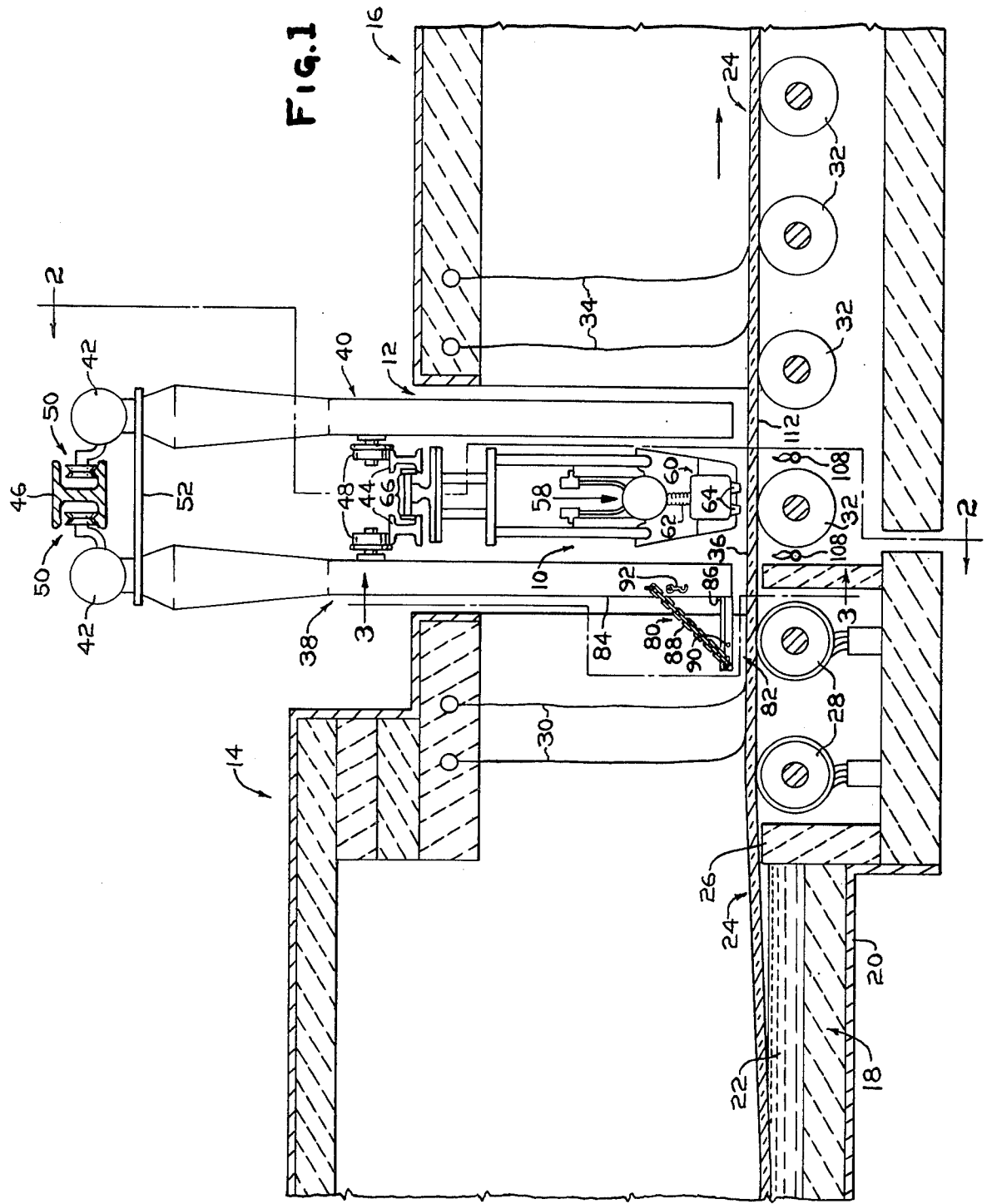
FIG. 1 is a partial sectional view of a coating chamber incorporating features of the invention positioned between a float forming chamber and an annealing lehr.

A coating apparatus 10 that may be used to practice the present invention and to the environment in which the invention may be practiced is shown in FIG. 1. The coating apparatus 10 is advantageously supported within a coating chamber 12, between a float forming chamber 14 and an annealing lehr 16.

The float forming chamber 14 is of the type used in the manufacture of float glass and, in general, includes a refractory container 18 encased in metal sheathing 20. The container 18 contains a bath 22 of molten metal, e.g., molten tin or alloys of tin.

In a typical float glass operation, a continuous ribbon of glass 24 is drawn either along the surface of or through the bath 22 of molten metal, preferably the former. A reducing atmosphere consisting primarily of nitrogen and hydrogen is provided in the forming chamber 14 to prevent oxidation of the tin. The bath 22 is maintained at an elevated temperature so that the glass ribbon supported on the bath is sufficiently soft to flow or "fire-polish" out surface irregularities. The temperature of the bath is progressively decreased along the direction of ribbon movement to permit the ribbon to harden with its surfaces smooth enough to avoid the need for grinding and polishing.

The glass ribbon 24 is lifted from the bath 22 of molten metal at exit end 26 of the chamber 14 on lift out rolls 28 of the type used in the art. The lift out rolls 28 are suitably journaled and driven by conventional roll driving facilities connected to a driving motor (not shown).

The glass ribbon 24 is passed from the forming chamber 14 while retaining the atmosphere in the forming chamber 14 by providing a series of curtains or drapes 30 which trail on the glass ribbon and serve as means for segregating the slightly pressurized atmosphere of the forming chamber 14 from the coating chamber 12. These drapes or curtains 30 are usually made of flexible asbestos or fiber glass material which does not mar the glass surface and which withstands the temperature of the environment, normally temperatures of approximately 1000° to 1200° F. (538° to 650° C.).

The glass ribbon 24 is conveyed through the coating chamber 12 and into an annealing lehr 16 by way of a plurality of lehr rolls 32 of the type used in the art. Conventional driving facilities (not shown) are provided for rotating the lehr rolls 32. Each lehr roll 32 exerts a tractive force on the glass ribbon 24 of sufficient magnitude to convey the glass ribbon through the lehr 16 where the glass ribbon temperature is controlled to relieve permanent stress and strain in the glass ribbon.

Drapes or curtains 34 similar to the drapes 30 are provided at the entrance of the lehr 16 to prevent extraneous coating vapor from moving into the annealing lehr 16.

The glass ribbon moves through the coating chamber 12 past the coating apparatus 19 which directs a coating fluid, e.g., a stream, vapor or mist to the heated upper surface 36 of the glass ribbon 22 to coat same. Shown in FIG. 1, is a vapor coating apparatus of the type disclosed in U.S. patent application Ser. Nos. 533,609 and 533,610 filed on Dec. 17, 1974, in the name of John F, Sopko and entitled "Coating Composition Vaporizer" that may be used in the practice of the invention.

As will become apparent to those skilled in the art, the invention is not limited to the type of coating apparatus that may be used to coat a heated substrate. For example, the coating apparatus taught in U.S. Pat. Nos. 3,660,061 and 3,850,679 and in U.S. Pat. application Ser. No. 315,394 filed on Dec. 15, 1972, in the name of Krishna Simhan and entitled "Nozzle for Chemical Vapor Deposition" now U.S. Pat. No. 3,888,649 may be used in the practice of the invention.

Figure 2:
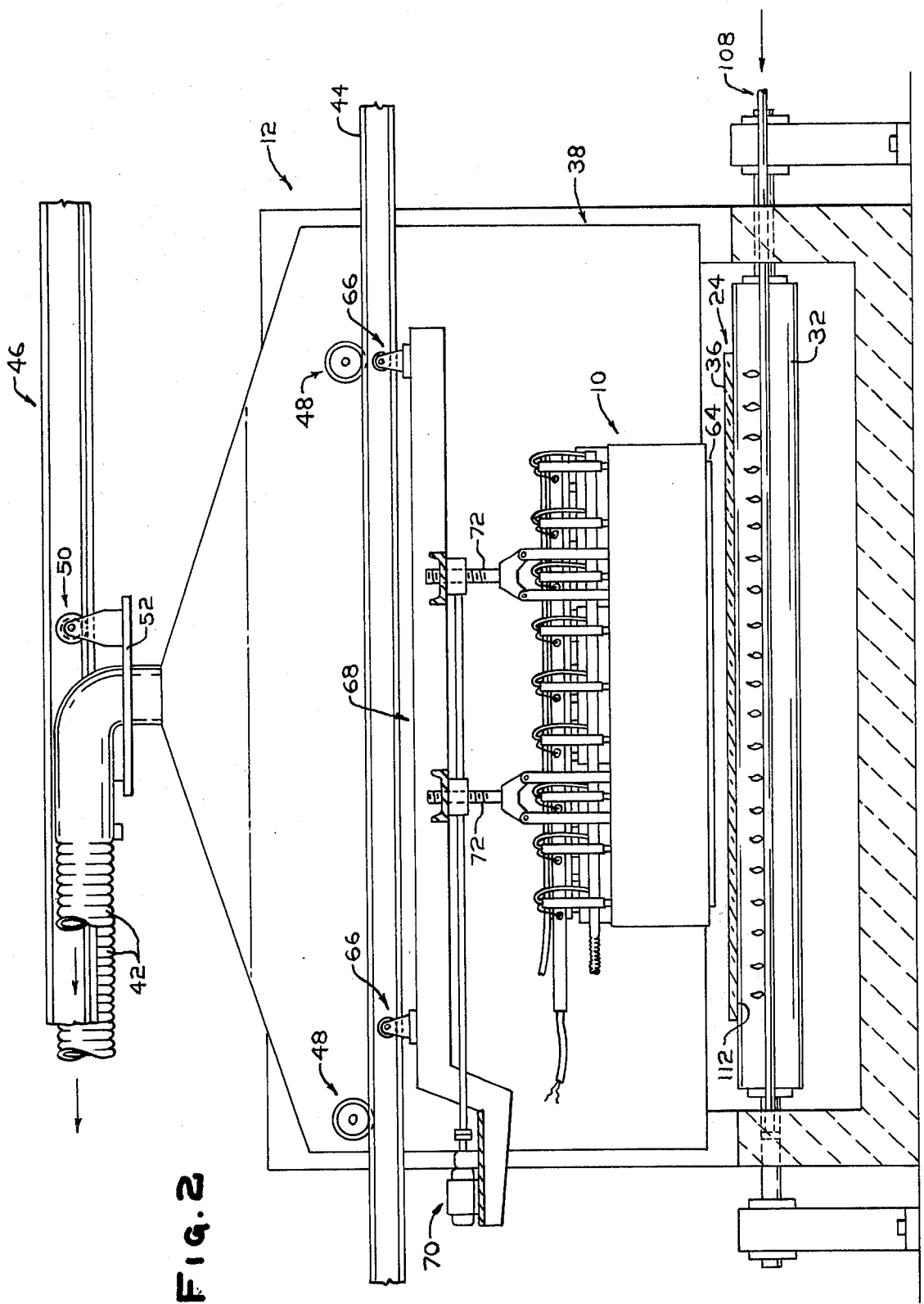
FIG. 2 is a partial sectional view taken along lines 2—2 of FIG. 1.

Referring now to FIGS. 1 and 2, the vapor coating chamber 12 is preferably provided with a vacuum hood 38 and a vacuum hood 40 having their inlet disposed upstream, adjacent the forming chamber, and downstream, adjacent the lehr, respectively. The vacuum hoods 38 and 40 extend vertically upward to a pair of exhaust pipes 42 and are sufficiently spaced from one another to provide sufficient room for supporting I-beams 44 and 46 and for the vapor coating apparatus 10. The vacuum hoods 38 and 40 are movably supported on I-beams 44 and 46 in any conventional manner, e.g., by wheel assembly 48 and 50 and held in spaced relation by cross brace 52. The I-beams 44 and 46 are disposed transversely across the substrate movement path in any conventional manner.

The entire vacuum hood assembly including the vacuum hoods 38 and 40 and exhaust pipes 42 may be moved transverse to the substrate movement path to completely remove the assembly from the float line for maintenance and repair.

The coating apparatus 10, in general, includes a vaporizer chamber 58 and a vapor distributor assembly 60 interconnected by a flexible tubing 62. An atomized spray of reactive coating material dissolved in a solvent is injected into streams of heated carrier gas in the vaporizer assembly 58. The heated carrier gas vaporizes the coating reactant to provide a coating vapor having a uniform distribution of coating reactant therein. The vapor moves past a heater (not shown) contained in the vaporizer chamber 58 and thereafter into the vapor distribution assembly 60 by way of flexible tubing 68. The coating vapor eminates from the distribution assembly through nozzles 64 against the glass ribbon surface 36 to coat same.

For a more detailed description of the coating apparatus 10, reference may be had to the above-mentioned U.S. Pat. No. 3,850,679 and U.S. patent applications Ser. Nos. 315,394; 533,609 and 533,610.

The reactive coating materials which are preferred for use in the present invention are the pyrolizable organo metallic salts of the metals of Groups Ib through VIIb and of Group VIII of the Periodic Chart of the Elements. The preferred organo metallic salts which are employed are betadiketonates, acetates, hexoates, formates and the like. The acetylacetonates of iron, cobalt and chromium are particularly preferred as the reactive ingredients of the present coating compositions.

While the coating reactants which are preferred for use in this invention are pyrolyzable materials, other kinds of reactants may also be employed. For example, hydrolytic reactants, such as fluorinated betadiketonates, particularly acetylacetonates, and metal dicumenes, may be used. Also reactants may be employed which require the presence of substantial quantities of other cooperating reactants such as oxygen, hydrogen, halogens or the like. As already indicated the preferred method for vaporization involves an initial step of solution so that the reactant or reactants employed should be easily dissolved in a suitable solvent.

A variety of aliphatic and olefinic hydrocarbons and halocarbons are suitable as solvents in carrying out the methods disclosed here. Single component solvent systems, particularly a solvent system employing methylene chloride, are effectively employed in the present invention. Solvent systems employing two or more solvents are also found to be particularly useful.

Some representative solvents which may be employed in carrying out the present invention are: methylene bromide, carbon tetrachloride, carbon tetrabromide, chloroform, bromoform, 1,1,1-trichloroethane, perchlorethylene, 1,1,1-trichloroethane, dichloroiodomethane, 1,1,2-tribromoethane, trichloroethylene, tribromoethylene, trichloromonofluoroethane, hexochloroethane, 1,1,1,2-tetrachloro-2-chloroethane, 1,1,2-trichloro-1,2-dichloroethane, tetrafluorobromethane, hexachlorobutadiene, tetrachloroethane and the like.

Other solvents may also be employed particularly as mixtures of one or more organic polar solvents, such as an alcohol containing 1 to 4 carbon atoms and one hydroxyl group and one or more aromatic non-polar compounds, such as benzene, toluene or xylene. The volatility of these materials makes their use somewhat more difficult than the above designated group of preferred halogenated hydrocarbons and halocarbons, but they have particular economic utility.

As can be appreciated the invention is not limited to the type of coating materials employed. For example, the coating materials taught in U.S. Pat. Nos. 3,410,710 and 3,852,098 may also be used in the practice of the invention. The above-mentioned patents are hereby incorporated by reference.

The coating apparatus 10 is movably supported between the vacuum hoods 38 and 40 on he I-beams 44 in any conventional manner, e.g., by wheel assemblies 66 to remove the coating apparatus 10 from the coating chamber 12 for maintenance and repair.

Preferably a mechanical structure 68 is operatively connected to the coating apparatus 10. This mechanical structure 68, as shown in FIG. 2, includes a motor 70 and jacks 72 connected to the coating apparatus 10 in any conventional manner for raising or lowering the coating apparatus 10 to position the nozzles 64 closer to or farther from the glass ribbon surface 36 to be coated.

The glass ribbon as it is displaced from the forming chamber 14 into the annealing lehr 16 has a temperature drop of between about 100°–200° F. (55°–111° C).

The temperature drop is due to radiation conduction and/or convection heat losses and is considered to be a function of (1) the glass ribbon thickness and (2) conveying speed. Additional ribbon heat losses result from the coating vapor which eminates from the nozzles 64 at about 380 SCFM (standard cubic feet per minute [10 cubic meters per minute] and a temperature of about 400° F. (205° C.)).

Typical examples of the glass ribbon temperature profile are as follows. A glass ribbon moving at a speed of about 227 inches/minutes (5.7 meters per minute) and having a thickness of about 0.250 inches (0.64 centimeter) has a temperature of about 1180° F. (638° C.) at the exit end 26 of the forming chamber 14; a temperature of about 1064° F. (573° C.) immediately upstream of the coating apparatus 10 and 1001° F. (538° C.) immediately downstream of the coating apparatus 10. A glass ribbon moving at a speed of about 426 inches per minute (10.8 meters per minute) and having a thickness of about 0.125 inches (0.32 centimeter) has a temperature of about 1190° F. (643° C.) at the exit end 36 of the forming chamber 14, a temperature of about 1090° F. (593° C.) immediately upstream of the coating apparatus 10 and 1035° F. (560° C.) immediately downstream 10 of the coating apparatus 10.

A more durable pyrolytic oxide coating is provided on the glass ribbon surface when the temperature of the surface during coating is above about 1050° (566° C.). As the temperature of the surfaces decrease at the time of coating, the durability of the coating decreases.

The durability to the coated glass may be determined in the following manner. A sample having dimensions of 12 inches (0.3 meter) by 12 inches (0.3 meter) is cut from the continuous glass ribbon. The samples are subjected to a continuous spray within an enclosed chamber described in Method 811 of the Federal Test Method Standard No. 151 (formally Federal Specification 22-M-151) entitled "Salt Spray Test", or in ASTM Test No. B-117-64. The spray is a 5 percent sodium chloride solution in the form of a fog that is sprayed at 95° F. (35° C.) and that condenses on the coating film surface for a period of about 30 days. Thereafter the color of the coating is visually observed for pin hole density.

It has been found that the durability of the coating is enhanced by applying the coating to the glass ribbon at a temperature of about greater than 1050° F. (566° C.). The upper temperature limit is considered to be about 1200° F. (649° C.), i.e., the temperature at which the glass is no longer dimensionally stable.

Normally, the temperature of the glass ribbon exiting the forming chamber is below about 1200° F. (649° C.), e.g., 1180° F. (637° C.) to 1190° F. (643° C.). The speed of the ribbon and the ribbon thickness are considered for purposes of the discussion of the invention to be interrelated, e.g., faster speeds for thinner glass ribbons. Increasing the temperature of the glass ribbon exiting from the forming chamber 14 to compensate for radiation, conduction and/or convection heat losses is not considered acceptable. This is because at temperatures above 1200° F. (649° C.) the glass ribbon is not dimensionally stable and the tractive forces 11 applied by the lehr rolls 32 would cause optical distortion of the glass ribbon.

Increasing the temperature of the coating vapor eminating from the nozzles 64 is not acceptable because the coating reactants normally used thermally and/or autocatalytically decompose at a temperature of above about 500° F. (304° C.) and would coat the inside components of the coating apparatus 10. Mounting the coating apparatus closer to the exit end 26 of the forming chamber also has drawbacks. More particularly, the exit end of the forming chamber would have to be reconstructed to accommodate the coating apparatus.

In accordance to the teachings of the invention and with reference to FIG. 1, there is shown a heat source 80 positioned immediately upstream of the hood 38 that minimizes or eliminates radiation, conduction and/or convection heat losses of the glass ribbon as it advances from the forming chamber 14 into the coating chamber 12 to provide a more durable pyrolytic oxide coating on the glass ribbon.

Figure 4:
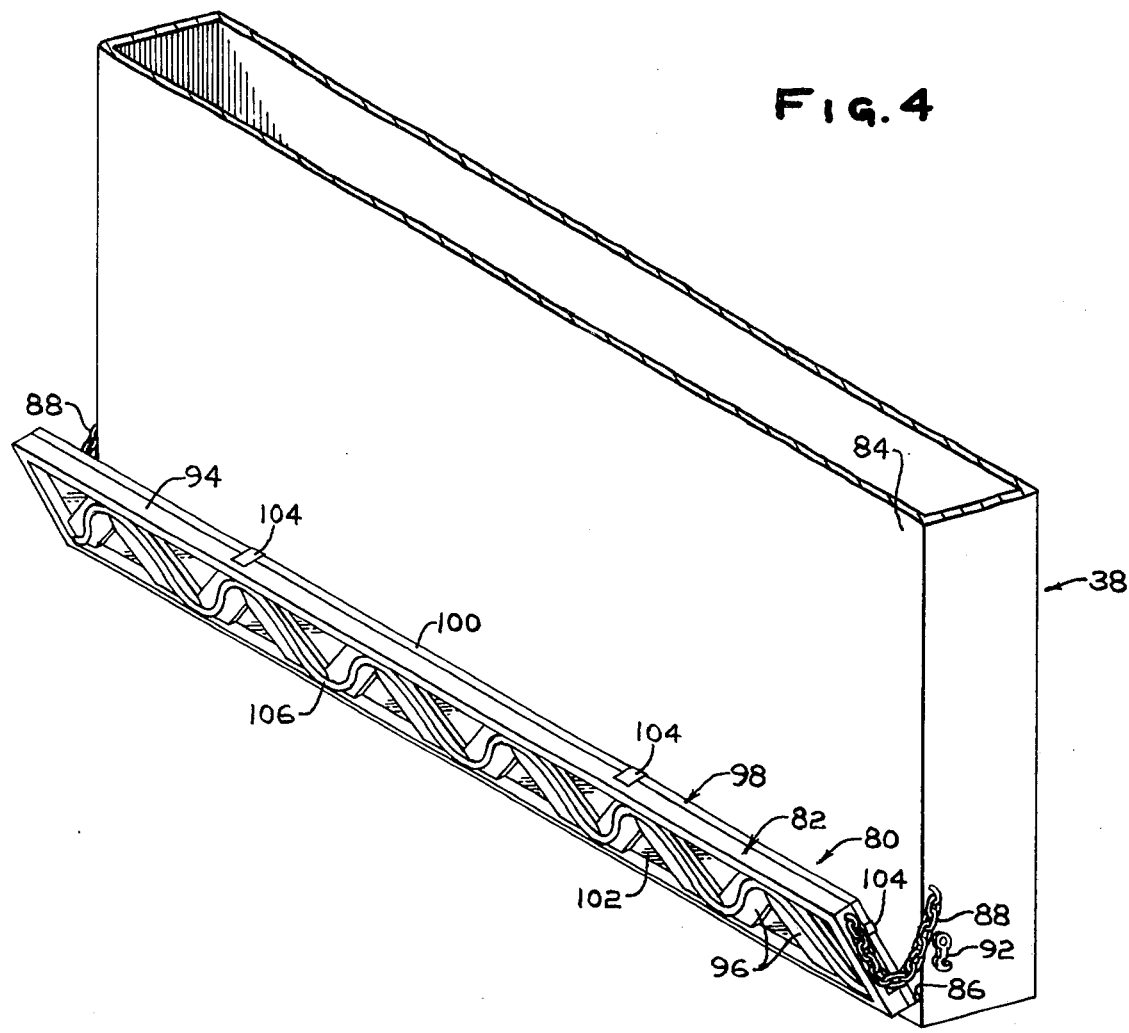
FIG. 4 is an isometric view having portions removed for purposes of clarity showing a heat source incorporating features of the invention mounted to an exhaust hood.
Figure 3:
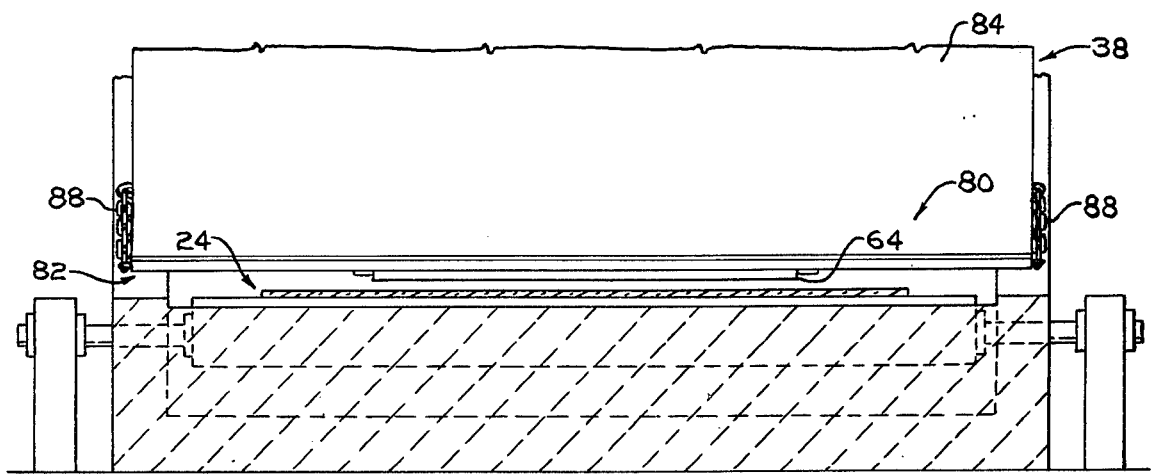
FIG. 3 is a partial sectional view taken along lines 3—3 of FIG. 1.

Referring now to FIGS. 1, 3 and 4, the heat source 80 includes a frame 82 hinged to side 84 of the exhaust hood 38 by way of a piano hinge 86 and supported above and generally parallel to the glass ribbon by chains 88 advantageously secured to the vacuum hood 38 and frame 82 of the heat source 80. The heat source 80 may be removed with the exhaust hoods 38 and 40 for repairs by locking the heat source 80 in a vertical portion by way of pins 90 mounted on a side of the frame 82 and latch member 92 pivotally mounted on the side of the exhaust hood (one shown in FIG. 1). The frame 82 may be made of ceramic, metal, or any other material capable of withstanding temperatures above about 1200° F. (649° C.).

Referring to FIG. 4, preferably the frame 82 includes an outer shell 94 and cross struts 96 therein to provide open areas to expose the glass ribbon surface 36 to an infrared reflective member 98. The infrared reflective member 98 may be any of the type known in the art to reflect infrared energy eminating from a body at temperatures of greater than about 1050° F. (565° C.). Types of infrared reflective members that may be used but limiting thereto are gold, tin oxide or indium oxide coat on a substrate as taught in U.S. Pat. Nos. 2,566,346; 3,107,177; 3,677,814; 3,447,936; 3,506,557 and 3,655,545 or aluminum to name a few. The infrared reflecting member reduces the radiant heat losses by reflecting the infrared energy eminating from the glass ribbon back to the glass ribbon. Preferably, the infrared reflective member 98 includes a plate 100, e.g., a glass sheet and an infrared reflective foil 102 secured on the frame 94 in any conventional manner, e.g., by clips 104.

A resistant heating element 106 is attached to the cross struts in any conventional manner and electrically connected to an electric potential (not shown). The heating element 106 heats the environment above the glass ribbon and the glass ribbon to minimize or eliminate convection and/or conduction heat losses from the glass ribbon.

As can now be appreciated, the invention is not limited to the construction of the heat source 80. For example, the heat source 80 may be heat lamps, resistance heating wires, or infrared reflective gas heaters to name a few.

The amount of heat input of the heating element 106 is a function of (1) the distance between the glass ribbon 36 and the heating element 106, (2) the glass ribbon area covered by the heating element 106, (3) the temperature of the glass ribbon passing under the heat source 80, (4) the temperature of the environment at the heat source 80, (5) the distance the glass ribbon travels from the exit end of the float chamber to the annealing lehr and (6) speed of ribbon.

As the distance between the glass ribbon surface 36 and the heating element 106 increases, while the remaining parameters are kept constant, power input to the heating element 106 should be increased.

Decreasing the area of the glass ribbon covered by the heating element 106 while the remaining parameters are kept constant, normally requires increasing the power input of the heating element 106. As the temperature of the glass ribbon or of the environment decreases, while remaining parameters are kept constant, the power input of the heating element should be increased. Increasing the speed of the glass ribbon while the remaining parameters are kept constant, the power input of the heating element 106 should be decreased. As the distance the glass ribbon travels to the coating apparatus, while the remaining parameters are kept constant, the power input of the heating element 106 should be increased.

The amount of heat contributed by the heating element 106 increases as the infrared reflectance coefficient to infrared energy of the reflective member 98 decreases and visa versa.

With the above parameters in mind a few specific examples will be considered. As can be appreciated, the examples are not limiting to the invention and are presented for illustrative purposes only.

Referring to FIG. 1, the coating apparatus 10 is spaced about 6 feet (1.8 meters) upstream of the exit end 26 of the forming chamber 14 and about 4 feet (1.2 meters) downstream of the entrance of the annealing lehr. The heat source 80 lies in a plane generally parallel to the surface 36 of the glass ribbon 24 with the heating element 106 spaced about 4 inches (10 centimeters) above the glass ribbon and the infrared reflective coating member 98 spaced about 4½ inches (11.7 centimeters) above the surface 36 of the glass ribbon. The heat source 80 has a length of about 12 feet (3.7 meters) to cover the surface of a 10 foot (3 meters) wide glass ribbon and a width of about 4 feet (1.2 meters). The center line of the heat source 80 is about 5 feet (1.5 meters) from the center line of the coating apparatus 10. The reflective member 98 has a reflectance coefficient of 1.00 to infrared energy.

The heating element 106 of the heat source 80 has an input of 120 BTUs per square foot (2772 calories per square meter) when coating a glass ribbon moving at a speed of 227 inches per minute (5.8 meters per minute), having a thickness of ¼ inch (0.64 centimeter) and an exit temperature of 1180° F. (638° C.). The expected temperature of the glass ribbon at the upstream exhaust hood 38 is 1170° F. (632° C.) and adjacent the annealing lehr entrance is 1100° F. (593° C.). The temperature of the glass ribbon without the heat source 80 of the invention is 1064° F. (583° C.) at the upstream exhaust hood 38 and 1001° F. (537° C.) at the entrance end of the annealing lehr.

The heating element 106 of the heat source has an input of 50 BTUs per square foot (1155 calories per square meter) when coating a glass ribbon moving at a speed of 426 inches per minute (10.8 meters per minute), a glass thickness of ⅛ inch (0.32 centimeter) and an exit temperature of 1190° F. (532° C.). The expected temperature of the glass ribbon at the upstream exhaust hood 38 is about 1170° F. (632° C.) and adjacent the annealing lehr entrance is about 1110° F. (599° C.). The temperature of the glass ribbon without practicing the invention has a temperature of about 1090° F. (589° C.) at the upstream exhaust and 1035° F. (557° C.) adjacent the entrance end of the annealing lehr.

As can now be appreciated, practicing the invention provides an economical way of eliminating or minimizing radiation, convection and/or conduction heat losses of the glass ribbon so that the glass ribbon at the time of coating is sufficiently hot thereby providing a pyrolytic oxide coating on the glass ribbon that is durable. Further practicing the invention reduces the temperature variation of the ribbon from 100° -200° F. (55°-111° C,) to a temperature variation of less than 100° F. (55° C.) as the ribbon advances from the forming chamber to the annealing lehr to provide a more controlled coating process.

The discussion will now be directed to the features of the invention to eliminate or minimize warpage of the glass ribbon. It has been observed that the glass ribbon, particularly for glass ribbons having a thickness of less than about ¼ inch (0.64 centimeter), warps as it advances past the coating apparatus 10. The warpage has a sinuous shape about an axis transverse to the glass ribbon path and has amplitudes of up to 3 inches (7.6 centimeters). As the thickness of the glass ribbon decreases, the warpage increases in frequency and amplitude.

The necessity of minimizing or eliminating the warpage can be appreciated when it is realized that the vacuum hoods 38 and 40, and nozzles 64 of the coating apparatus 10 of the type taught in the above-mentioned application Ser. Nos. 315,394; 533,609 and 533,610 are spaced about 3 inches (8 centimeters) and ¼ inch (0.32 centimeter), respectively. A warped glass ribbon can hit the nozzles and/or vacuum hood scratching or fracturing the glass ribbon.

To eliminate the glass ribbon warpage in accordance to the teachings of the invention, there is shown in FIGS. 1 and 2 positioned beneath the glass ribbon 24 and transverse to the glass ribbon movement path a pair of heaters 108, e.g., gas burners to heat the undersurface 112 of the glass ribbon. The amount of heat directed toward glass ribbon is dependent on the speed of the glass ribbon, the glass ribbon thickness and the distance between the glass ribbon and the gas heaters 108. As the thickness of the glass ribbon increases while the ribbon speed and heaters 108 remain constant, the amount of heat applied may be decreased. For glass ribbon thickness of about greater than ¼ inch (0.64 centimeter) the heat directed toward the glass ribbon is minimal. As the glass ribbon speed increases with the glass ribbon thickness and heaters 108 remaining constant, the amount of heat applied may be decreased. Increasing the distance between the glass ribbon and heaters 108 for a given ribbon speed and thickness permits decreasing the heat input of the heater.

For example, for (1) a glass ribbon having a thickness of about ⅛ inch (0.32 centimeter) and a speed of about 426 inches/minute (108 meters per minute) and (2) a distance between the pipes and glass ribbon of 1 foot (0.3 meter) and a flame height of 6 inches (0.15 meter), the recommended amount of heat applied is 2 BTUs per square foot (46 calories per square meter). Preferably the heaters 108 are positioned in spaced relation to each other and below the coating apparatus 10 and the glass ribbon 24. Although as shown in FIG. 1 there are shown gas burners 108 and it can now be appreciated that the invention is not limited thereto.

For example, one, two, three or more heaters may be used. Further, the invention is not limited to the type of heat source employed. The heat source may be resistance heaters or infrared lamps or infrared reflectance heaters to name a few.

Although it is not completely understood it is believed that the heat applied to the lower surface 112 of the glass ribbon eliminates glass ribbon warpage in the following manner.

The glass ribbon as it advances past the coating apparatus is coated with a vapor having a temperature of about 400° F. (216° C.) that cools the top surface 36 of the glass ribbon causing it to contract. This contraction causes the glass ribbon to warp. Heating the bottom surface 112 of the glass ribbon makes it pliant and the glass ribbon slumps under its own weight thereby minimizing or eliminating the glass ribbon warpage.

As can now be appreciated, the present invention can be practiced (1) using a heat source above the glass ribbon to minimize radiation, conduction and/or convection heat losses to increase the durability of the coating and the heat source beneath the glass ribbon to eliminate the glass ribbon warpage; (2) using only a heat source to enhance the durability of the coating or (3) using only the heat source to eliminate or minimize glass ribbon warpage.

DETAILED DESCRIPTION OF THE INVENTION

The invention will be described to coat a glass ribbon 24 passing from a forming chamber 14, through a coating chamber 12 into an annealing lehr.

Referring to FIG. 1, the forming chamber 14 is of the type used in flat glass manufacturing art and, in general, includes a container 18 made of refractory material for containing a bath 22 of molten tin. A reducing atmosphere of 95% nitrogen and 5% hydrogen is provided in the forming chamber 14 at a positive pressure to prevent the oxidation of the tin.

The glass ribbon 24 is supported on the molten tin and moves downstream toward exit end 26 of the forming chamber 14. The temperature of the bath progressively decreases along the direction of ribbon movement to permit the glass ribbon to harden with the surfaces smooth enough to avoid the need for polishing or grinding.

At the exit end 26 of the forming chamber 14, the glass ribbon is lifted from the molten tin by lift out rolls 28 of the type used in the art and is advanced past asbestos curtains 30 into the coating chamber 12. The asbestos curtains 30 which trail on the glass serve to segregate the slightly pressurized atmosphere of the forming chamber 14 from the coating chamber 12.

The glass ribbon is advanced through the coating chamber 12 and the annealing lehr 16 by a plurality of lehr rolls 32 of the type used in the art.

Within the coating chamber there is provided an upstream vacuum hood 38 and a downstream vacuum hood 40 of the type disclosed in the above-mentioned U.S. patent applications Ser. No. 533,609 and 533,610. The hoods 38 and 40 are movably mounted on I-beams 44 and 46 by way of wheel assemblies 48 and 59 and spaced 4 inches (10 centimeters) from top surface 36 of the glass ribbon 24. A coating apparatus 10 is movably mounted in the coating chamber 10 and includes a vaporizer chamber 58 connected to a vapor distribution assembly 60 by way of flexible tubing 62. The vapor distribution assembly 60 includes a pair of nozzles 64 of the type taught in the above-mentioned U.S.

patent application Ser. No. 315,394 which are positioned about ¼ inch (0.32 centimeter) from the upper surface 36 of the glass ribbon by way of motor 70 and jacks 72.

The coating apparatus 10 is spaced about 6 feet (1.8 meters) from the exit end 26 of the forming chamber 14 and 4 feet (1.2 meters) from the entrance end of the annealing lehr 16. The upstream vacuum hood 38 and the downstream vacuum hood 40 are each spaced about 1 foot (0.3 meter) from the center of the coating apparatus 10.

Referring now to FIGS. 1, 3 and 4, the discussion will now be directed to heat source 80 for heating the upper surface 36 of the glass ribbon in accordance to the teachings of the invention.

The heat source 80 includes a steel frame 82 pivotally mounted to the upstream side 84 of the upstream vacuum hood 38 by way of a piano hinge 86. The frame has an outside length of about 12 feet (3.6 meters), an outside width of about 5 feet (1.5 meters), an inside length of about 11 feet (3.3 meters), an inside width of about 4 feet (1.2 meters) and a thickness of about 2 inches (5 centimeters). Cross struts 96 each about 4½ feet (1.35 meters) in length are mounted within the frame 82 to support a 27 feet (8.1 meters) long nickel chromium heating element 106. The element 106 is connected at one end to an electric potential (not shown). A 0.01 inch (0.025 centimeter) thick gold foil is mounted on a sheet of glass 100 to provide an infrared reflector member 98. The member 98 is secured to the frame 82 by way of clip 104.

The heating source 80 is maintained in a plane generally parallel to the top surface 36 of the glass ribbon and spaced 4 inches (10 centimeters) by the hinge 86 and chains 88 as shown in FIG. 3.

The annealing lehr 16 shown in FIG. 1 is of the type used in the art to relieve residual stress in the glass ribbon. Provided at the entrance end of the annealing lehr are asbestos drapes 34.

EXAMPLE I

Using the arrangement disclosed, a glass ribbon 24 having a thickness of ¼ inch (0.64 centimeter) and moving at a speed of 227 inches per minute (5.8 meters per minute) will be coated.

A coating solution having the following composition on a one gallon basis is used to coat the glass ribbon.

| | |
|---|---|
| Iron acetylacetonate | 510 grams |
| Chromium acetylacetonate | 55 grams |
| Cobalt acetylacetonate | 510 grams |
| Methylene chloride | 1 gallon |

The coating solution is atomized and injected into streams of hot carrier gas in the vaporizer chamber 50 to provide a reactant coating vapor. The reactant coating vapor passes through a heater (not shown) positioned in the vaporizer chamber 50 and then into the vapor distribution assembly 60 by way of the flexible tubing 62. The vaporizer chamber and vapor distribution assembly 60 are of the type taught in the abovementioned U.S. patent application Ser. No. 533,609 and 533,610.

The reactant coating vapor pass out of the vapor distribution assembly 60 by way of nozzles 64 toward the surface 36 of the glass ribbon at 380 SCFM (10 cubic meters per minute) and a temperature of about 400° F. (205° C.).

The resistant wire 106 has an input of 120 BTUs per square foot (2772 calories per square meter).

The glass ribbon (1) at the exit end 26 of the forming chamber 14 has a temperature of about 1180° F. (638° C.), (2) at the upstream end of the coating apparatus has a temperature of about 1170° F. (632° C.), and (3) at the downstream end of the coating apparatus has a temperature of about 1100° F. (593° C.).

EXAMPLE II

In addition to using the arrangement of Example I, to coat a glass ribbon having a thickness of ⅛ inch (0.32 centimeter) and moving at a speed of 426 inches per minute (10.8 meters per minute), heat source 108 shown in FIGS. 1 and 2 will be used to eliminate or minimize glass ribbon warpage.

Referring now to FIGS. 1 and 2, there is provided a pair of pipes 108 extending under the glass ribbon 24 transverse to the glass ribbon movement and spaced 1 foot (0.3 meter) from the glass ribbon movement path. The pipes each have a length of 12 feet (3.6 meters) and are on a center-to-center spacing of about 15 inches (0.4 meter) with each pipe spaced about 7½ inch (0.2 meter) from the center line of the coating apparatus 10.

The resistance wire 106 of the heat source 80 has an input of 50 BTUs per square foot (1155 calories per square meter) and each of the gas pipes 108 have an input of 1 BTU per square foot (23 calories per square meter).

The glass ribbon (1) at the exit end 26 of the forming chamber 14 has a temperature of about 1190° F. (532° C.). (2) at the upstream end of the coating apparatus 10 has a temperature of about 1170° F. (632° C.) and (3) at the downstream end of the coating apparatus has a temperature of about 1110° F. (599° C.).

The glass ribbon warpage at the downstream end of the coating apparatus has its amplitude reduced from about 2 inches (5 centimeters) to about ½ inch (1.27 centimeters) by practicing the invention.

EXAMPLE III

In this Example, a glass ribbon having a thickness of 0.090 inch (0.23 centimeter) and moving at a speed of 561 inches per minute (14 meters per minute) will be coated. The apparatus is similar to that of Example II except the heat source 80 is held in the vertical position by pin 90 and latch 92 shown in FIG. 1.

Each of the pipes has a heat input of ½ BTU per square foot (12 calories per square meter).

The glass ribbon warpage at the downstream end of the coating apparatus has its amplitude reduced from about 3 inches (7.5 centimeters) to about ½ inch (1.27 centimeters) by practicing the invention.

As can now be appreciated the examples are merely illustrative of the invention and are not limiting thereto.

What is claimed is:

1. In a method of coating a glass ribbon wherein the coating method includes the step of forming a glass ribbon in a forming chamber having a controlled atmosphere and means positioned adjacent an exit end of the forming chamber for maintaining the atmosphere in the forming chamber and for minimizing heat convection from the forming chamber; advancing the glass ribbon along a predetermined path out of the forming chamber toward coating means, coating a first surface of the ribbon at the coating means, the ribbon as it advances past the coating means warps, the improvement comprising:

directly heating a second surface of the glass ribbon opposite the first surface in an amount sufficient to substantially reduce the warpage; and practicing said heating step adjacent the second surface of the glass ribbon below a coating zone of the coating means.

2. The coating method as set forth in claim 1 wherein the glass ribbon has a thickness of less than about ¼ inch (0.64 centimeter) and said heating step is accomplished by:

directing at least 4 BTUs per square foot (95 calories per square meter) of heat toward the glass ribbon.

3. The coating method as set forth in claim 1 wherein the glass is coated prior to annealing and further including the step of:

annealing the coated glass ribbon.

4. The method of coating a glass ribbon as set forth in claim 1, wherein the glass ribbon as it advances along the predetermined path decreases in temperature further including the step of:

directing infrared energy toward the glass ribbon as it advances from the minimizing and maintaining means toward the coating chamber means wherein the temperature of the glass ribbon prior to entering the coating means is adjusted and maintained by the infrared energy.

5. The coating method as set forth in claim 4 wherein said directing step directs energy at the rate of at least about 120 BTUs per square foot (2772 calories per square meter) toward the ribbon.

6. The coating method as set forth in claim 4 wherein; and said directing step is practiced toward the first surface of the glass ribbon.

7. The coating method as set forth in claim 6 wherein the glass is coated prior to annealing and further including the step of:

annealing the coated glass ribbon.

8. An apparatus for manufacturing a coated glass ribbon wherein the apparatus is of the type having a chamber for forming a glass ribbon, the forming chamber having a controlled atmosphere and including means positioned adjacent exit end of the forming chamber for minimizing heat convection from the forming chamber and for maintaining the atmosphere in the forming chamber; coating chamber positioned downstream of the forming chamber, the coating chamber including coating means therein; and means for moving the glass ribbon from the forming chamber past the minimizing and maintaining means toward the coating chamber along a ribbon movement path, the movement path having a first side and a second opposite side with the coating chamber and coating means mounted above the first side of the ribbon movement path, the improvement comprising infrared heating means mounted outside the forming chamber between (1) the minimizing and maintaining means and (2) coating chamber to direct infrared energy toward the ribbon movement path;

means for heating mounted on the second side of the ribbon path and spaced from the coating means said heating means directing heat toward the second side of the ribbon movement path.

9. The apparatus as set forth in claim 8 wherein said infrared heating means includes an infrared reflector plate.

10. The apparatus as set forth in claim 8 wherein said infrared heating means further includes an infrared heater.

11. The apparatus as set forth in claim 8 wherein the forming chamber is a flat glass forming chamber and further including:

an annealing lehr positioned downstream of the coating means.

* * * * *

UNITED STATES PATENT AND TRADEMARK OFFICE
CERTIFICATE OF CORRECTION

PATENT NO. : 4,022,601
DATED : May 10, 1977
INVENTOR(S) : John F. Sopko

It is certified that error appears in the above-identified patent and that said Letters Patent are hereby corrected as shown below:

Column 12, line 61, "step" should be --steps--.

Column 13, line 5, --to-- should be added between the words "opposite" and "the".

Column 13, line 29, delete "chamber".

Signed and Sealed this

Fourth Day of October 1977

[SEAL]

Attest:

RUTH C. MASON
Attesting Officer

LUTRELLE F. PARKER
Acting Commissioner of Patents and Trademarks